United States Patent
Saieg et al.

(10) Patent No.: US 8,991,839 B1
(45) Date of Patent: Mar. 31, 2015

(54) AXLE SUSPENSION SYSTEM

(71) Applicant: ArvinMeritor Technology, LLC, Troy, MI (US)

(72) Inventors: Steven George Saieg, Rochester Hills, MI (US); Craig Allen Holt, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/280,936

(22) Filed: May 19, 2014

(51) Int. Cl.
*B60G 9/00* (2006.01)
*B60G 13/00* (2006.01)

(52) U.S. Cl.
CPC .............. *B60G 9/003* (2013.01); *B60G 13/005* (2013.01)
USPC ...... 280/124.116; 280/124.128; 280/124.157; 280/124.153

(58) Field of Classification Search
CPC .. B60G 9/003; B60G 13/005; B60G 2200/31; B60G 2204/129; B60G 2300/026
USPC .................... 280/124.116, 124.128, 124.157, 280/124.153, 124.11, 86.5
See application file for complete search history.

(56) References Cited

U.S. PATENT DOCUMENTS

| | | | | |
|---|---|---|---|---|
| 4,334,696 A * | 6/1982 | Bergstrom | ............. | 280/124.104 |
| 5,005,856 A * | 4/1991 | Shibahata | ............. | 280/124.128 |
| 6,241,266 B1 | 6/2001 | Smith et al. | | |
| 7,293,781 B2 * | 11/2007 | Power et al. | ............... | 280/6.151 |
| 7,900,942 B2 * | 3/2011 | Koschinat | ............. | 280/124.111 |
| 8,333,396 B2 | 12/2012 | Saieg et al. | | |
| 2006/0181047 A1 * | 8/2006 | Chamberlin et al. | .. | 280/124.128 |
| 2011/0089660 A1 | 4/2011 | Dodd et al. | | |
| 2013/0154224 A1 | 6/2013 | Wakefield et al. | | |

FOREIGN PATENT DOCUMENTS

| | | | |
|---|---|---|---|
| DE | 31 43 933 A1 * | 5/1983 | |
| DE | 10 2005 022 745 B4 * | 4/2009 | |
| DE | 10 2012 106 152 A1 * | 1/2014 | |
| EP | 2 189 311 B1 * | 1/2013 | |

* cited by examiner

*Primary Examiner* — Ruth Ilan
(74) *Attorney, Agent, or Firm* — Brooks Kushman P.C.

(57) ABSTRACT

An axle suspension system for a vehicle. The axle suspension system may include a trailing arm assembly that may have a shock absorber passage. A shock absorber may extend through the shock absorber passage.

19 Claims, 3 Drawing Sheets

AXLE SUSPENSION SYSTEM

TECHNICAL FIELD

This patent application relates to an axle suspension system that may be provided with a vehicle.

BACKGROUND

A top mount trailing arm suspension is disclosed in U.S. Pat. No. 8,333,396.

SUMMARY

In at least one embodiment, an axle suspension system is provided. The axle suspension system may include an axle and a trailing arm assembly disposed proximate the axle. The trailing arm assembly may include a trailing arm that may have a shock absorber passage, a hanger bracket pivotally mounted to the trailing arm, and a shock absorber. The shock absorber may extend through the shock absorber passage and may be connected to the trailing arm assembly at a first end and may be connected to the hanger bracket at a second end.

In at least one embodiment, an axle suspension system is provided. The axle suspension system may include an axle and a trailing arm assembly that may be mounted to the axle. The trailing arm assembly may include an axle wrap, a shock absorber mounting bracket, a trailing arm, a hanger bracket, and a shock absorber. The axle wrap may be fixedly disposed on the axle. The shock absorber mounting bracket may be disposed on the axle wrap. The trailing arm may be disposed on the axle wrap and may have a sleeve that may extend through the trailing arm. The hanger bracket may be spaced apart from the axle and may be pivotally mounted on the trailing arm. The shock absorber may extend through the sleeve and may be pivotally coupled to the shock absorber mounting bracket at a first end and may be pivotally coupled to the hanger bracket at a second end.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
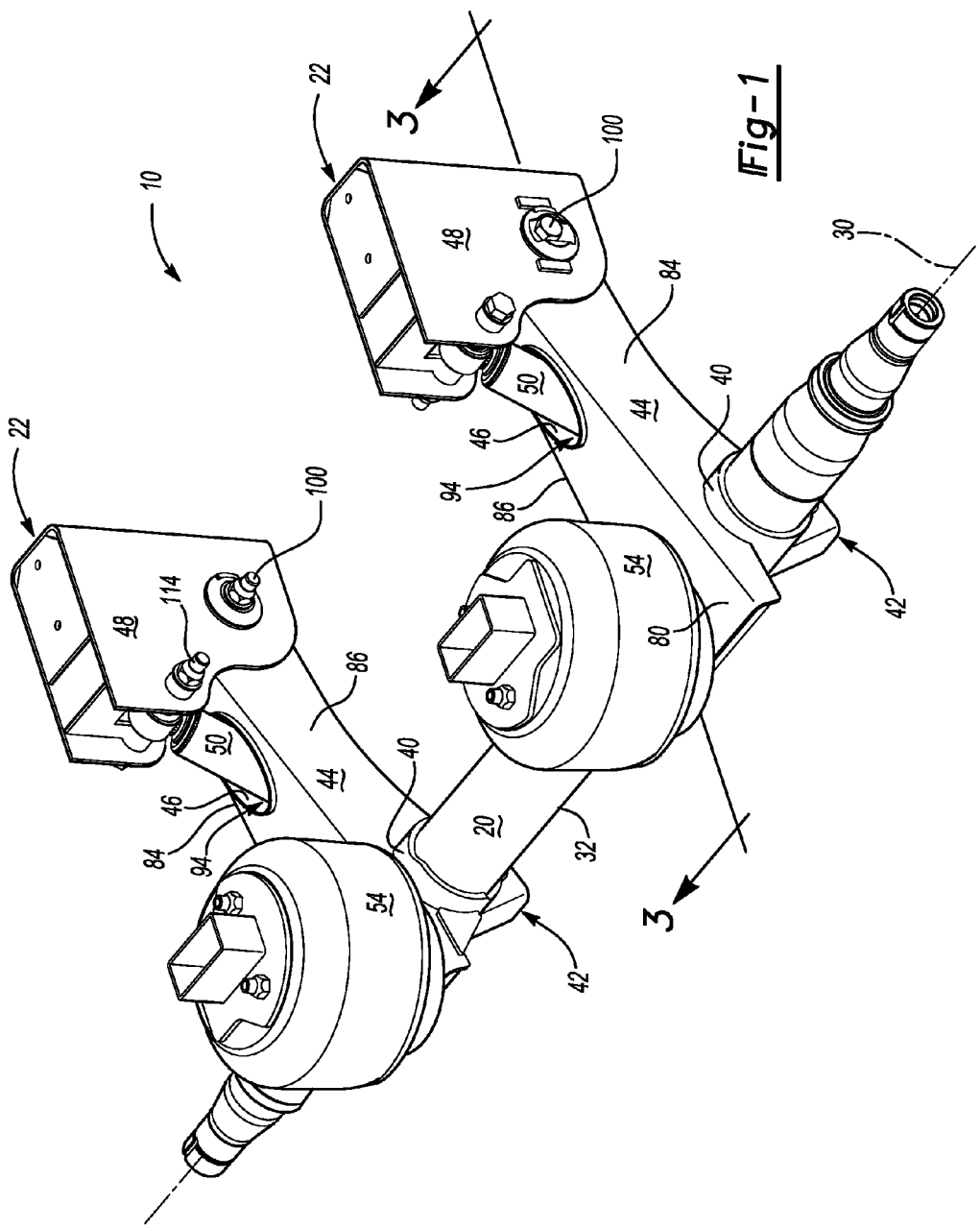
FIG. 1 is a perspective view of an exemplary axle suspension system.

Referring to FIG. 1, an exemplary axle suspension system 10 is shown. The axle suspension system 10 may be provided with a vehicle, such as motor vehicle or a trailer that may be provided with a motor vehicle. The axle suspension system 10 may include an axle 20 and at least one trailing arm assembly 22.

The axle 20 may extend along an axis 30 and may have an exterior surface 32. The exterior surface 32 may be an exterior circumference of the axle 20.

One or more wheel hub assemblies may be rotatably disposed on the axle 20. A wheel hub assembly may be provided at each end of the axle 20. Each wheel hub assembly may be configured to receive a wheel upon which a tire may be mounted.

One or more trailing arm assemblies 22, which may also be referred to as trailing suspension arms, may be mounted on the axle 20. In the embodiment shown, two trailing arm assemblies 22 are provided that are spaced apart from each other. As is best shown with reference to FIGS. 1 and 2, each trailing arm assembly 22 may include an axle wrap 40, a shock absorber mounting bracket 42, a trailing arm 44, a sleeve 46, a hanger bracket 48, a shock absorber 50, a pedestal mount 52, and an air spring 54.

The axle wrap 40 may be fixedly disposed on the axle 20. The axle wrap 40 may be positioned between the trailing arm 44 and the axle 20 and may facilitate mounting of the trailing arm 44 to the axle 20.

Figure 2:
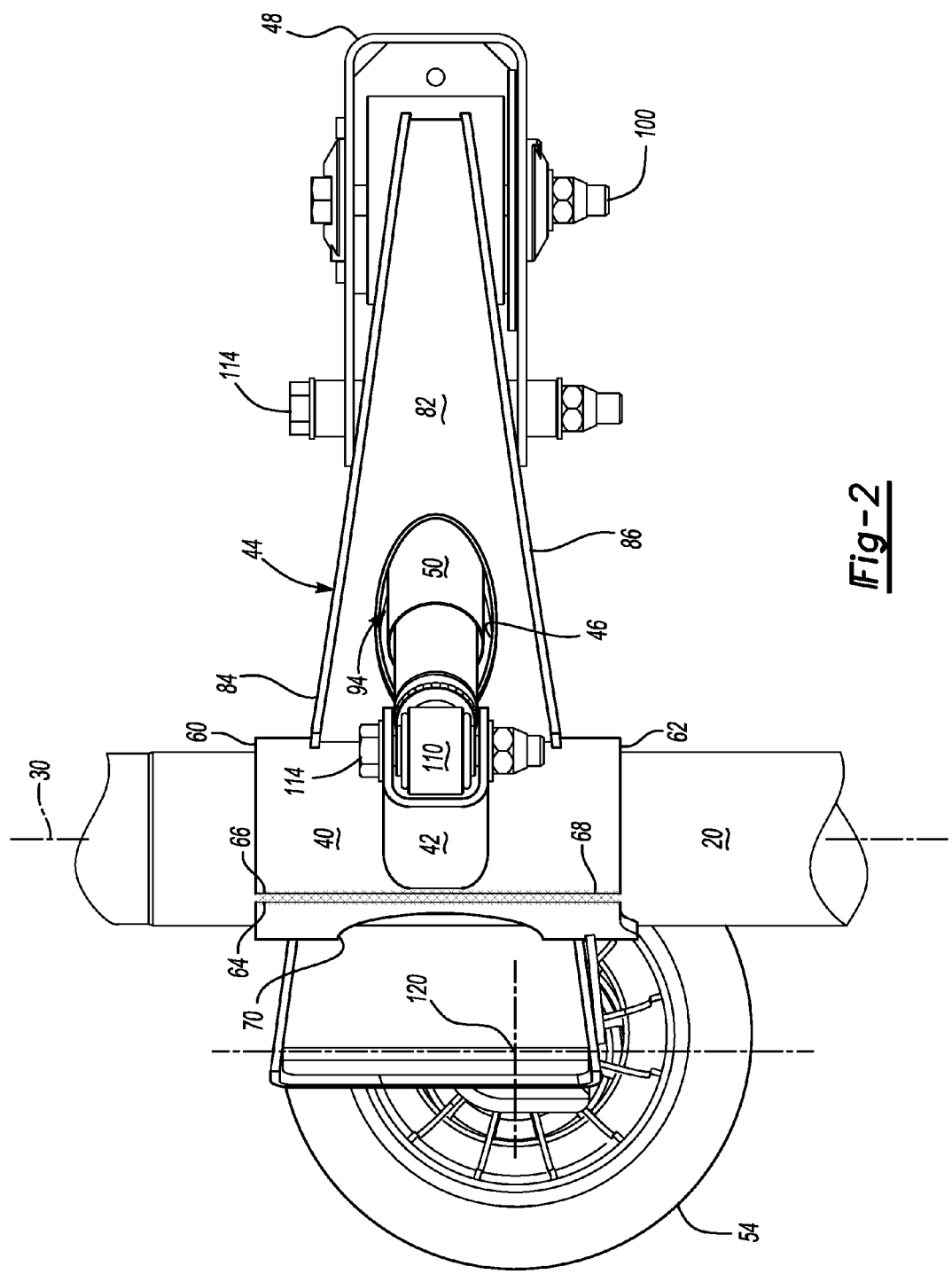
FIG. 2 is a bottom view of a portion of the axle suspension system of FIG. 1.

The axle wrap 40 may engage and extend at least partially around the exterior surface 32 or circumference of the axle 20. For example, the axle wrap 40 may extend completely around the exterior surface 32 of the axle 20 or may extend partially around the exterior surface 32 of the axle 20, such as more than halfway or more than 180° around the exterior surface 32 of the axle 20. In FIG. 2, the axle wrap 40 extends almost entirely around the axle 20 and includes a first side surface 60, a second side surface 62, a first end surface 64, and a second end surface 66.

The first side surface 60 may be disposed opposite the second side surface 62. In addition, the first side surface 60 and the second side surface may be radially disposed about the axis 30 in one or more embodiments.

The first end surface 64 and the second end surface 66 may extend from the first side surface 60 to the second side surface 62. In addition, the first end surface 64 may be spaced apart from and may be disposed opposite the second end surface 66. The first end surface 64 and the second end surface 66 may be positioned below the axis 30 and may be positioned below and spaced apart from the trailing arm 44 in one or more embodiments to help facilitate assembly.

Figure 3:
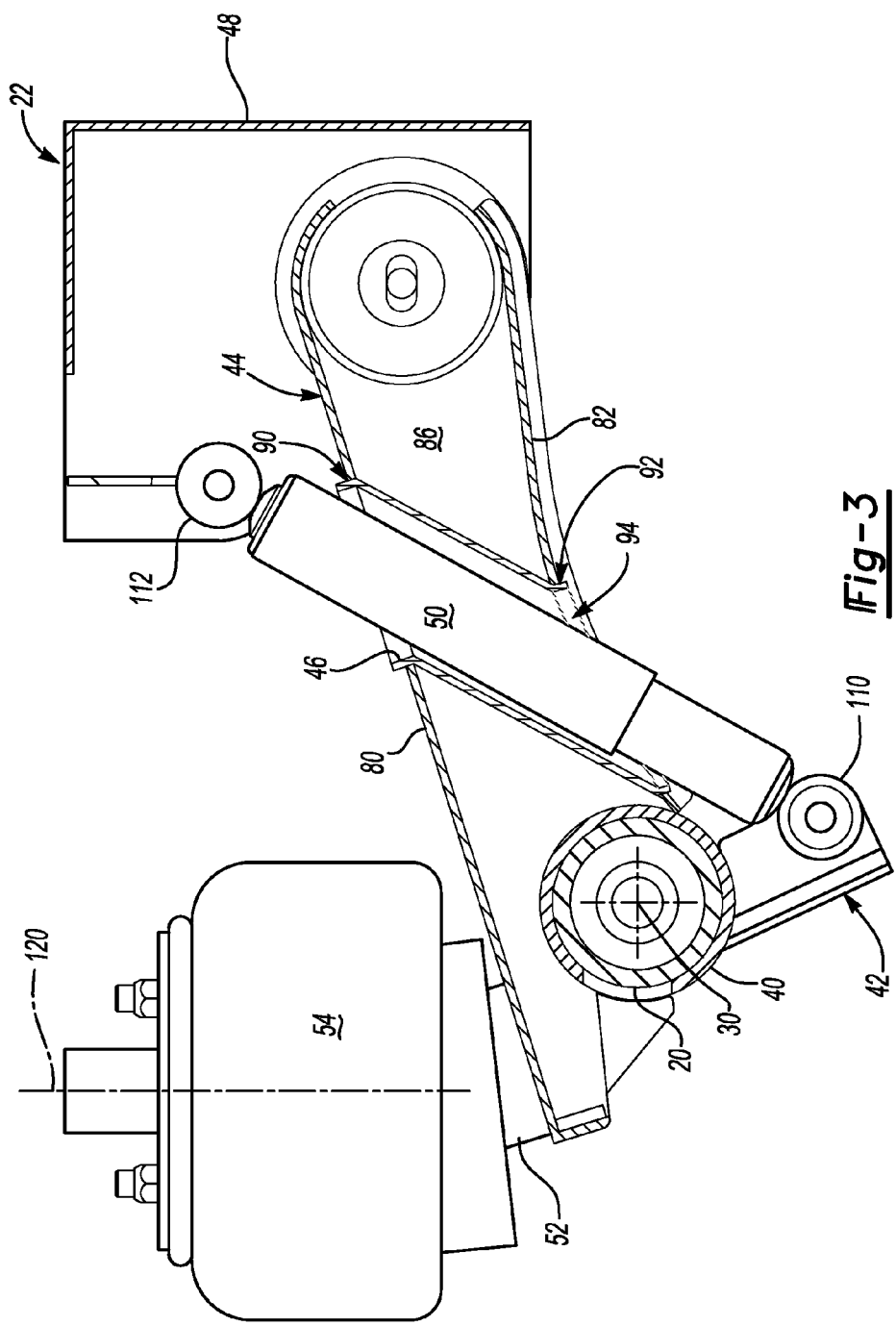
FIG. 3 is a cross-sectional view of the axle suspension system along section line 3-3.

A weld seam 68, which is shown in FIG. 2 and omitted from FIGS. 1 and 3 for clarity, may be provided between a first end surface 64 and a second end surface 66 to help attach the axle wrap 40 to the axle 20. The weld seam 68 may extend from the first side surface 60 to the second side surface 62.

Referring to FIG. 2, the axle wrap 40 may include at least one weld window 70 that may be configured as a through hole that may extend through the axle wrap 40. The weld window 70 may be completely defined by or bounded within the axle wrap 40 and may be disposed between and may be spaced apart from the first and second side surfaces 60, 62 and the first and second end surfaces 64, 66. In at least one embodiment, a weld may be provided that may extend around the weld window 70 to help couple the axle wrap 40 to the axle 20. In addition, the weld window 70 may be disposed between and may be spaced apart from the weld seam 68 and the trailing arm 44.

Referring to FIGS. 1-3, the shock absorber mounting bracket 42 may be fixedly disposed on or with respect to the axle wrap 40. Moreover, the shock absorber mounting bracket 42 may be completely disposed below the axis 30 of the axle 20 as is best shown in FIG. 3. As such, the shock absorber mounting bracket 42 may be disposed below or directly underneath the trailing arm 44 and may be spaced apart from the trailing arm 44.

The trailing arm 44 may be fixedly disposed on the axle wrap 40. The trailing arm 44 may be coupled to the axle wrap 40 in any suitable manner, such as by welding. The axle wrap 40 may be disposed between the axle 20 and the trailing arm 44. As such, the trailing arm 44 may be spaced apart from and may not engage the axle 20. In at least one embodiment, the trailing arm 44 may include a first wall 80, a second wall 82, a first side wall 84, and a second side wall 86.

The first wall 80 may be disposed along the top of the trailing arm 44. As is best shown in FIG. 3, the first wall 80 may include an opening 90 through which the shock absorber 50 and the sleeve 46 may extend. The opening 90 may be completely disposed in or defined by the first wall 80 such that the opening 90 may be spaced apart from the first side wall 84 and the second side wall 86. The first wall 80 may be spaced apart from the axle wrap 40. As such, a portion of the first wall 80 may be disposed between the axle wrap 40 and the air spring 54.

The second wall 82 may be disposed along a bottom of the trailing arm 44. The second wall 82 may be spaced apart from the first wall 80 and may be disposed proximate or may engage the axle wrap 40. In addition, the second wall 82 may also include an opening 92 through which the shock absorber 50 and the sleeve 46 may extend. The opening 92 may be completely disposed in or defined by the second wall 82 such that the opening 92 may be spaced apart from the first side wall 84 and the second side wall 86. The opening 92 in the second wall 82 may be disposed closer to the axle 20 and the axle wrap 40 than the opening 90 in the first wall 80 in one or more embodiments. The opening 90 in the first wall 80 and the opening 92 in the second wall 82 may at least partially define a shock absorber passage 94.

The first side wall 84 may be disposed along a lateral side of the trailing arm 44 and may face toward an end of the axle 20 that may be disposed closest to the trailing arm assembly 22. The first side wall 84 may extend from the first wall 80 to the second wall 82 and may disposed proximate or may engage the axle wrap 40. As such, the first side wall 84 may be fixedly coupled to the axle wrap 40 via a joining process like welding or brazing. The first side wall 84 may be disposed substantially perpendicular to the first wall 80 and/or second wall 82 in one or more embodiments. In addition, the first side wall 84 may be spaced apart from the weld window 70.

The second side wall 86 may also be disposed along a lateral side of the trailing arm 44. In addition, the second side wall 86 may be disposed opposite and may be spaced apart from the first side wall 84. The second side wall 86 may extend from the first wall 80 to the second wall 82 and may disposed proximate or may engage the axle wrap 40. As such, the second side wall 86 may be fixedly coupled to the axle wrap 40 via a joining process like welding or brazing. The second side wall 86 may be disposed substantially perpendicular to the first wall 80 and/or second wall 82 in one or more embodiments. In addition, the second side wall 86 may be spaced apart from the weld window 70.

The sleeve 46, if provided, may extend at least partially through the trailing arm 44 and may receive the shock absorber 50. For example, the sleeve 46 may be disposed proximate or may extend through the opening 90 in the first wall 80 and the opening 92 in the second wall 82. As such, the sleeve 46 may at least partially define the shock absorber passage 94 and may extend from the first wall 80 to the second wall 82 in one or more embodiments. The sleeve 46 may be spaced apart from the axle wrap 40. Moreover, the sleeve 46 may be fitted against and/or fixedly coupled to the first wall 80 and the second wall 82 to help provide structural support for the trailing arm 44 and/or to help inhibit contaminants from entering the interior of the trailing arm 44. The sleeve 46 may be disposed between and may be spaced apart from the first side wall 84 and the second side wall 86. In addition, the sleeve 46 may extend continuously around and may be spaced apart from the shock absorber 50. As such, the sleeve 46 may not engage the shock absorber 50 throughout the stroke of the shock absorber 50. The sleeve 46 may have any suitable configuration that does not interfere with operation of the shock absorber 50. For instance, the sleeve 46 may have an oval cross section in one or more embodiments, which may help reduce stress concentrations as opposed to a configuration with intersecting surfaces or panels.

The hanger bracket 48 may be pivotally disposed at an end of the trailing arm 44 that may be disposed opposite the axle wrap 40. The hanger bracket 48 may be configured to be mounted to and support a vehicle frame or chassis. The hanger bracket 48 may receive a pivot bolt 100 that may extend through the hanger bracket 48 and a bushing (not shown) disposed within the trailing arm 44. As such, the trailing arm 44 may pivot about the bushing (not shown) and the pivot bolt 100 with respect to the hanger bracket 48.

The shock absorber 50 may be provided to dampen shock impulses and dissipate kinetic energy. The shock absorber 50 may extend through the sleeve 46 and may have a first end 110 and a second end 112. The first end 110 may be pivotally mounted to the shock absorber mounting bracket 42, such as with a fastener 114. As such, the first end 110 may be disposed below the axis 30 and axle wrap 40. The second end 112 may be pivotally mounted to the hanger bracket 48, such as with another fastener 114. As such, the second end 112 may be disposed above the axle 20, sleeve 46, and first wall 80. The pedestal mount 52 may be disposed proximate an end of the trailing arm 44 that may be disposed opposite the hanger bracket 48. The pedestal mount 52 may be fixedly disposed on the first wall 80 and may be configured to support the air spring 54. As such, the pedestal mount 52 may be disposed on an opposite side of the first wall 80 from the axle wrap 40.

The air spring 54 may be disposed proximate and may be fixedly disposed on the pedestal mount 52. As such, the air spring 54 may be disposed the shock absorber mounting bracket 42 may be disposed opposite the air spring 54 or on an opposite side of the axle 20 from the air spring 54. The air spring 54 may also be mounted to the support frame or chassis of the vehicle. As such, the air spring 54 may receive compressed air and may be provided to absorb shocks and vibrations to improve ride quality. In addition, the air spring 54 may provide self-leveling functionality.

As is best shown in FIGS. 2 and 3, the air spring 54 may have a center axis 120 that may offset from the shock absorber 50 or center axis of the shock absorber. Thus, the air spring 54 may not be aligned with the sleeve 46 or shock absorber 50 and may be disposed further from the nearest end of the axle 20 than the shock absorber 50 as is best shown in FIG. 1.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle suspension system comprising:
an axle; and
a trailing arm assembly disposed proximate the axle, the trailing arm assembly including:
a trailing arm that has a shock absorber passage;
a hanger bracket pivotally mounted on the trailing arm;
a shock absorber that extends through the shock absorber passage and is connected to the trailing arm assembly at a first end and connected to the hanger bracket at a second end; wherein the trailing arm assembly further comprises an axle wrap disposed on the axle and a shock absorber mounting bracket that is disposed on the axle wrap below an axis of the axle, wherein the first end of the shock absorber is mounted to the shock absorber mounting bracket.

2. The axle suspension system of claim 1 wherein the trailing arm has a first wall and a second wall disposed opposite the first wall, wherein the shock absorber extends through the first wall and the second wall.

3. The axle suspension system of claim 1 wherein the trailing arm assembly further comprises a sleeve that at least partially defines the shock absorber passage, wherein the shock absorber extends through the sleeve.

4. The axle suspension system of claim 3 wherein the shock absorber is spaced apart from and does not engage the sleeve.

5. The axle suspension system of claim 3 wherein the sleeve extends continuously around the shock absorber.

6. The axle suspension system of claim 3 wherein the sleeve has an oval cross section.

7. The axle suspension system of claim 3 wherein the trailing arm has a first wall and a second wall that is spaced apart from the first wall, wherein the sleeve extends from the first wall to the second wall.

8. The axle suspension system of claim 1 wherein the shock absorber mounting bracket is disposed below and is spaced apart from the trailing arm.

9. The axle suspension system of claim 1 wherein the shock absorber mounting bracket is disposed directly underneath the trailing arm.

10. An axle suspension system comprising:
an axle; and
a trailing arm assembly that is mounted to the axle, the trailing arm assembly including:
an axle wrap that is fixedly disposed on the axle;
a shock absorber mounting bracket that is disposed on the axle wrap;
a trailing arm that is disposed on the axle wrap and that has a sleeve that extends through the trailing arm;
a hanger bracket that is spaced apart from the axle and pivotally mounted on the trailing arm; and
a shock absorber that extends through the sleeve and is pivotally coupled to the shock absorber mounting bracket at a first end and pivotally coupled to the hanger bracket at a second end.

11. The axle suspension system of claim 10 wherein the first end is disposed below the axle and the second end is disposed above the axle.

12. The axle suspension system of claim 10 wherein the sleeve is spaced apart from the axle wrap.

13. The axle suspension system of claim 10 wherein the trailing arm has a first wall and a second wall disposed opposite the first wall, wherein the sleeve extends from the first wall to the second wall.

14. The axle suspension system of claim 13 wherein the trailing arm further comprises a first side wall and a second side wall that extend between the first wall and the second wall, wherein the sleeve and the shock absorber are disposed between the first side wall and the second side wall.

15. The axle suspension system of claim 14 wherein the sleeve is spaced apart from the first side wall and the second side wall.

16. The axle suspension system of claim 14 wherein the first side wall and the second side wall engage the axle wrap.

17. The axle suspension system of claim 14 wherein the first wall is spaced apart from the axle wrap and the second wall engages the axle wrap.

18. The axle suspension system of claim 13 further comprising an air spring that is disposed proximate the first wall, wherein the shock absorber mounting bracket is disposed opposite the air spring.

19. The axle suspension system of claim 18 wherein the air spring has a center axis, wherein the air spring is offset from the shock absorber such that the center axis is disposed further from an end of the axle than the shock absorber.

* * * * *